US008726566B2

(12) United States Patent
Ray, III et al.

(10) Patent No.: US 8,726,566 B2
(45) Date of Patent: May 20, 2014

(54) SEED LABELS AND MANUFACTURING METHOD THEREOF

(75) Inventors: Thomas D. Ray, III, Birmingham, AL (US); Robert J. Alden, Birmingham, AL (US); Tommy Wayne Gill, Moody, AL (US); Steve Posey, Gardendale, AL (US); James J. Carides, Tampa, FL (US)

(73) Assignee: Raypress Corporation, Birmingham, AL (US)

( * ) Notice: Subject to any disclaimer, the term of this patent is extended or adjusted under 35 U.S.C. 154(b) by 0 days.

(21) Appl. No.: 12/801,582

(22) Filed: Jun. 15, 2010

(65) Prior Publication Data

US 2011/0302835 A1    Dec. 15, 2011

(51) Int. Cl.
*A01C 1/04*    (2006.01)
*B41J 19/62*    (2006.01)

(52) U.S. Cl.
USPC .............................................. 47/56; 400/310

(58) Field of Classification Search
USPC ................................................ 47/56; 400/310
See application file for complete search history.

(56) References Cited

U.S. PATENT DOCUMENTS 6,594,927 B2 *    7/2003    Witkowski ...................... 40/310

\* cited by examiner

*Primary Examiner* — Monica Williams
(74) *Attorney, Agent, or Firm* — Mannava & Kang, P.C.

(57) ABSTRACT

A seed label which can be removably affixed to a package includes a label layer removably attached to a clear film layer by an adhesive layer, and at least one seed disposed between the label layer and the clear film layer. The label layer may be made of biodegradable material and may include water-based ink printing thereon. The adhesive layer may be a dry release-clean release adhesive layer can be formed of a water-based adhesive. The seed label can be placed in a container for germinating the seeds. A method of manufacturing a seed label includes providing a label layer, automatically placing at least one seed on one side of the label layer, and automatically attaching the label layer to a clear film layer by an adhesive layer, with the seed disposed between the label layer and the clear film layer.

15 Claims, 3 Drawing Sheets

SEED LABELS AND MANUFACTURING METHOD THEREOF

BACKGROUND OF INVENTION a. Field of Invention

The invention relates generally to a label and manufacturing method thereof, and, more particularly, to a plantable seed label, and a manufacturing method thereof.

b. Background Art

Flexographic printing of multi-page booklet or leaflet labels affixed to a carrier web is well known in the industry. The web or roll of finished booklet labels can be automatically applied by a machine to numerous products or product packaging. The printed material may include recipes, instructions, warnings, mail-in promotions and the like. After application thereof, the booklet can be conveniently removed from the product or package by a consumer without defacing the surface thereof or leaving the underlying surface obscured.

Such labels and multi-page booklets are only associated with seeds to the extent a package of seeds may have a label or multi-page instruction booklet printed thereon. A user typically takes the seeds out of the package and discards the label or instruction booklet after use. With regard to manufacturing, such seed packages and labels may be either stapled together or have the label or instruction booklet adhesively attached to the package. As readily apparent, automated manufacturing of these types of seed packages can be expensive and even require manual steps depending on the type of packaging, and type and quantity of seeds. Moreover, with such packaging often made by the hundreds-of-thousands, elimination of one or more steps or components can yield significant cost, manufacturing time and waste elimination benefits.

It would therefore be of benefit to minimize and/or eliminate use of one or more of such packaging and manufacturing requirements, and use of one or more of such packaging components for seed packaging.

BRIEF SUMMARY OF THE INVENTION

In an embodiment, the invention provides a seed label including a label layer removably attached to a clear film layer by an adhesive layer, and at least one seed disposed between the label layer and clear film layer.

For the seed label described above, the label layer may be made of a biodegradable material. The adhesive layer may be a dry release-clean release adhesive layer. The label layer may include water-based ink printing thereon. The adhesive layer may be a water-based adhesive. The seed label may be removably affixed to a package. The seed label may be disposable in a container for germinating the seeds.

The invention also provides a method of manufacturing a seed label, includes providing a label layer, automatically placing at least one seed on one side of the label layer, and automatically attaching the label layer to a clear film layer by an adhesive layer, with the seed disposed between the label layer and clear film layer.

For the method described above, the method may further include automatically die-cutting the label layer. The label layer may be made of a biodegradable material. The adhesive layer may be a dry release-clean release adhesive layer. The label layer may include water-based ink printing thereon. The adhesive layer may be a water-based adhesive. The method may further include removably affixing the seed label to a package. The seed label may be disposable in a container for germinating the seeds.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and, together with the detailed description, serve to explain the principles of the invention. In the drawings.

DETAILED DESCRIPTION OF EMBODIMENTS OF THE INVENTION

Figure 1:
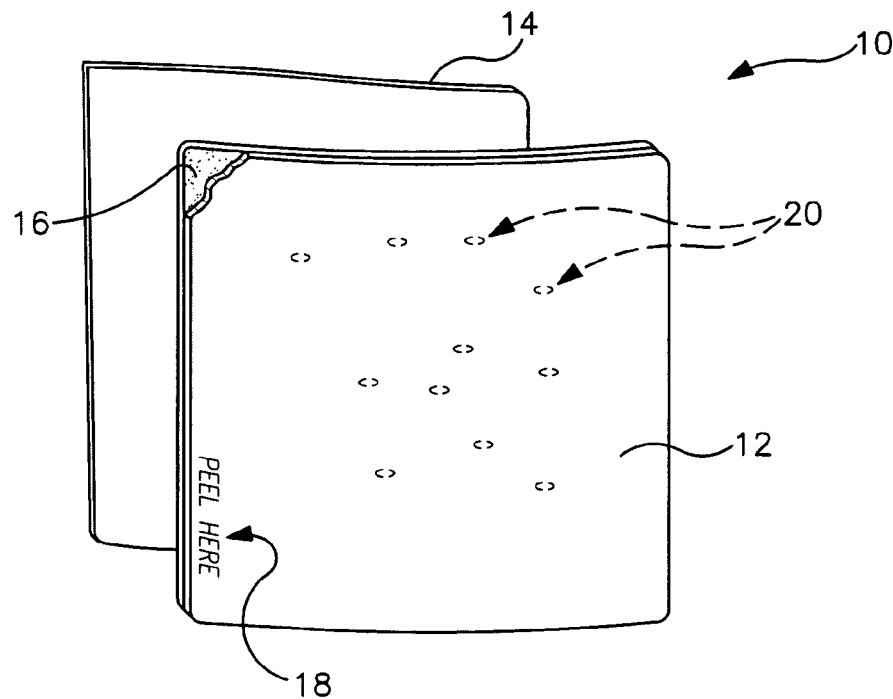
FIG. 1 is an illustrative view of a plantable seed label according to the invention, with the various layers shown in an exploded configuration.

Referring now to the drawings wherein like reference numerals designate corresponding parts throughout the several views, FIGS. 1-5 illustrate a plantable seed label according to the invention, related components, and a label machine for manufacture thereof.

Figure 2:
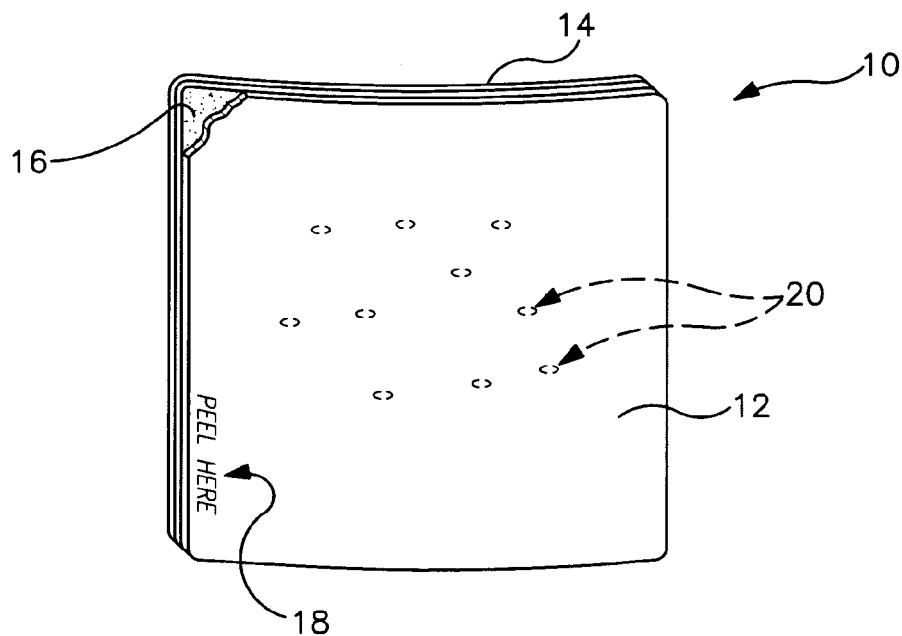
FIG. 2 is an illustrative view of the plantable seed label of FIG. 1, shown in an assembled configuration.

Referring to FIGS. 1 and 2, plantable seed label 10 may generally include a biodegradable paper label 12 removably attached to a leave-behind clear film layer 14 by a dry release-clean release layer 16. Paper label 12 may include printing from water-based inks, and include instructions, such as at 18, for removal of the paper label, and other instructions for using an associated product. The adhesive used for dry release-clear release layer 16 may also be water-based. A plurality of seeds 20 may be disposed between biodegradable paper 12 and the film layer 14, and affixed only to biodegradable paper label 12 due to the dry release-clean release properties of film layer 14. The seeds may be affixed to paper label 12 when dry release-clean release layer 16 is wet. Plantable seed label 10 may be removably affixed to a package 22, with film layer 14 being permanently affixed to the package in one embodiment by a pressure sensitive adhesive, thus permitting removal of biodegradable paper label 12 and seeds 20 from film layer 14, and thus package 22 (see FIG. 4).

Figure 3:
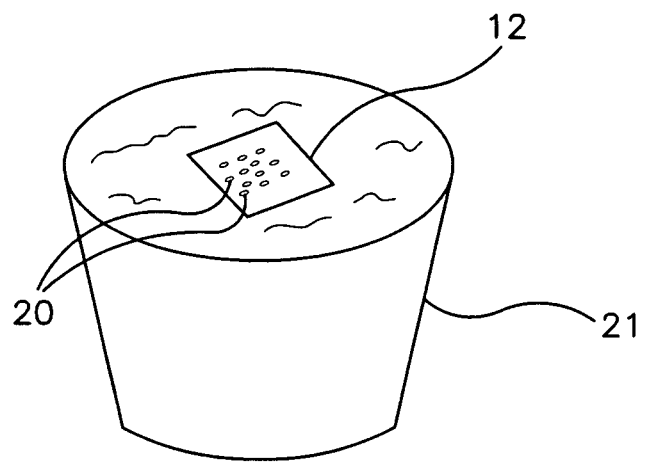
FIG. 3 is an exemplary illustration of the plantable seed label of FIG. 1, shown in a planted configuration.
Figure 4:
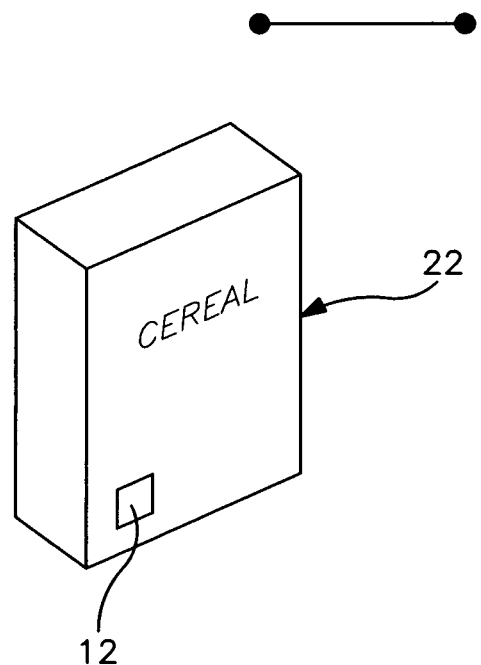
FIG. 4 is an illustrative view of the plantable seed label of FIG. 1, shown affixed to an exemplary package.

In use, a user may simply remove paper label 12 with seeds 20 affixed thereto from film layer 14, and "plant" the combination label 12 with seeds 20 positioned above label 12 as shown in FIG. 3 in pot 21. Standard potting soil may be placed on top of label 12 and seeds 20, or in the case of seeds that do not need soil or other such additions, the seeds may simply be placed in the appropriate configuration (e.g., above or below label 12) and water or other growing material may be added as needed. In time, biodegradable paper label 12 may dissolve, and the seeds would generate. Further, with the use of water-based adhesives and ink materials, there would be no interference with the growth of seeds 20.

Figure 5:
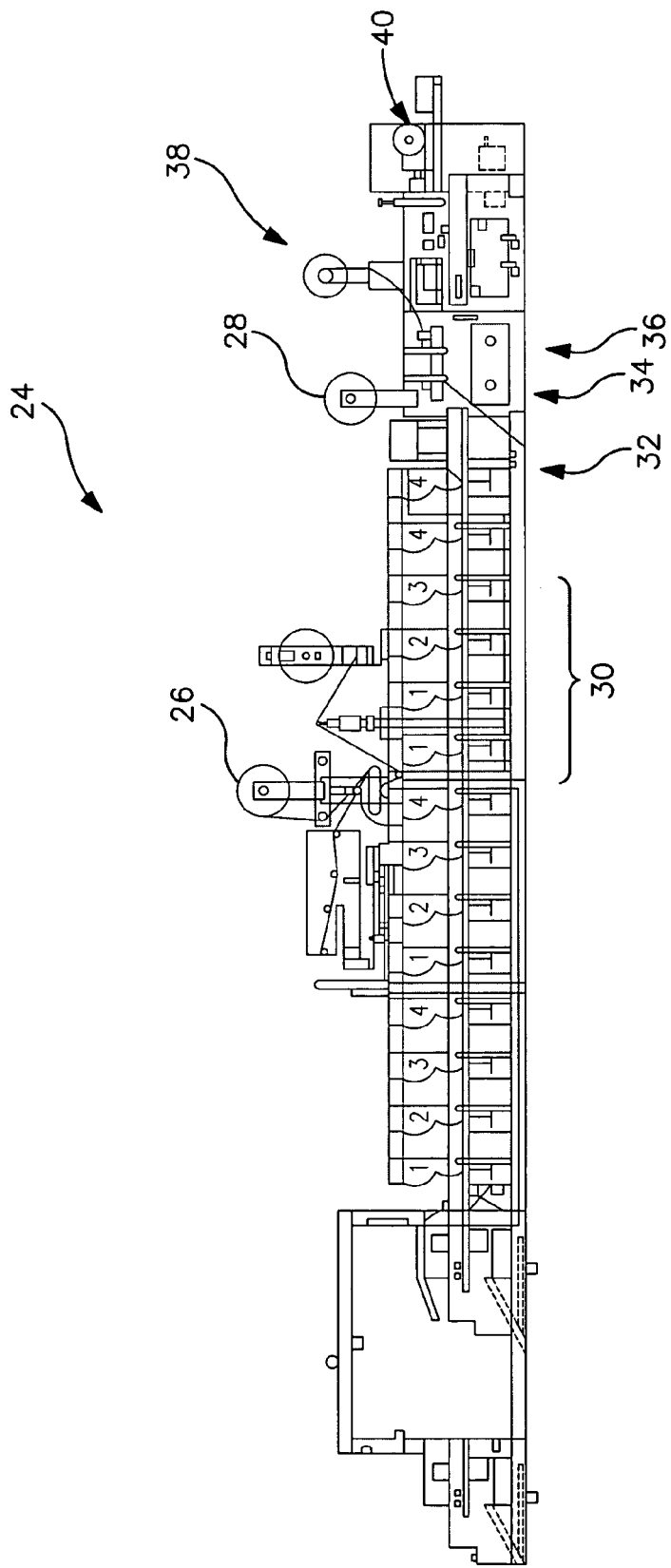
FIG. 5 is an exemplary view of a label machine for manufacturing the plantable seed label of FIG. 1.

In order to manufacture plantable seed label 10, an exemplary label machine 24 is illustrated in FIG. 5. For label machine 24, a typical roll 26 of biodegradable label stock of desired width may be placed on a spool. The roll of label stock may include a backing layer having an adhesive layer between the biodegradable label stock and the backing layer. A roll 28 of clear film layer 14 may be placed on a spool. The width for roll 26 for biodegradable paper label 12 may be smaller than that for roll 28 for clear film layer 14.

The first roll of biodegradable label stock may be fed through print stations, such as stations 30 of label machine 24. Once printed, the backing layer may be separated from the biodegradable paper and film label layer, at which time seeds may be sprayed (or otherwise distributed) onto the back of the biodegradable paper label layer within boundaries of the eventual label, as shown in FIG. 1 at location 32. Alternatively, if the dry release-clean release adhesive is applied to the biodegradable paper label as a secondary step, the seeds may be sprayed on when the adhesive is wet. With seeds sprayed on, the biodegradable paper label layer may be married to the roll of clear film layer 14 at location 34, and then die cut through at location 36 through just the layer of the biodegradable paper label layer. The waste matrix may be appropriately discarded at for example at location 38, and the finished roll may then be rewound at location 40, with a liner disposed behind clear film layer 14. Using a label-applying machine installed in the user's production line, the finished roll may be automatically and rapidly affixed to a product or package 22. The finished roll may thus include a base liner (not shown), film layer 14 affixed to the base liner with a pressure sensitive adhesive (not shown), biodegradable paper label 12 affixed to film layer 14 with dry release-clean release adhesive layer 16 and seeds disposed therebetween, with the liner being removed for application to a package 22.

Although several embodiments of this invention have been described above with a certain degree of particularity, those skilled in the art may make numerous alterations to the disclosed embodiments without departing from the scope of this invention. All directional references (e.g., upper, lower, upward, downward, left, right, leftward, rightward, top, bottom, above, below, vertical, horizontal, clockwise and counterclockwise) are only used for identification purposes to aid the readers understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not as limiting. Changes in detail or structure may be made without departing from the invention as defined in the appended claims.

What is claimed is:

1. A plantable seed label comprising:
   a plantable label layer having front and back surfaces;
   a clear film layer in register with the plantable label layer, and having front and back surfaces;
   a first adhesive layer between the back surface of the plantable label layer and the front surface of the clear film layer;
   at least one seed positioned between the back surface of the plantable label layer and the front surface of the clear film layer, the at least one seed being further positioned above or below the back surface of the plantable label layer when the plantable label layer is removed from the clear film layer and disposed in a generally horizontal configuration, wherein the least one seed is affixed to the plantable label layer only by the first adhesive layer; and
   a second adhesive layer on the back surface of the clear film layer, the second adhesive layer being formed of a pressure-sensitive adhesive for permanently attaching the plantable seed label to a package.

2. The plantable seed label according to claim 1, wherein the plantable label layer comprises a biodegradable material.

3. The plantable seed label according to claim 1, wherein the first adhesive layer comprises a dry release-clean release adhesive that is disposed in intimate contact with and adherent to the at least one seed.

4. The plantable seed label according to claim 1, wherein the plantable label layer includes water-based ink printing thereon.

5. The plantable seed label according to claim 1, wherein the first adhesive layer comprises a water-based adhesive to prevent interference with germination of the at least one seed.

6. A combination of a package and the plantable seed label according to claim 1.

7. The plantable seed label according to claim 1, wherein the at least one seed is located between the back surface of the plantable label layer and the first adhesive layer and wherein the plantable label layer is removable from the clear film layer for placement in a container for seed germination.

8. A method of germinating a seed using the plantable seed label according to claim 1, the method comprising:
   removing the plantable label layer from the clear film layer; and
   placing the removed plantable label layer in a container for seed germination.

9. A method of manufacturing a plantable seed label, comprising:
   automatically placing at least one seed on one surface of a plantable label layer such that the at least one seed is positioned above or below the surface of the plantable label layer when the plantable label layer is removed from a clear film layer and disposed in a generally horizontal configuration;
   automatically affixing the least one seed to the plantable label layer only by an adhesive layer; and
   automatically attaching the plantable label layer to the clear film layer by the adhesive layer, with the seed disposed between the plantable label layer and the clear film layer.

10. The method of manufacturing according to claim 9, further comprising automatically die-cutting the plantable label layer.

11. The method of manufacturing according to claim 9, wherein the plantable label layer comprises a biodegradable material.

12. The method of manufacturing according to claim 9, wherein the first adhesive layer comprises a dry release-clean release adhesive that is disposed in intimate contact with and adherent to the at least one seed.

13. The method of manufacturing according to claim 9, wherein the plantable label layer includes water-based ink printing thereon.

14. The method of manufacturing according to claim 9, wherein the adhesive layer comprises a water-based adhesive to prevent interference with germination of the at least one seed.

15. The method of manufacturing according to claim 9, further comprising affixing the plantable seed label to a package.

\* \* \* \* \*